(12) United States Patent
Powers et al.

(10) Patent No.: US 7,642,683 B2
(45) Date of Patent: Jan. 5, 2010

(54) SELF-REGULATING PERMANENT MAGNET DEVICE

(75) Inventors: Theodore Clifton Powers, Sycamore, IL (US); Michael Raymond Hernden, Rockford, IL (US); Mahesh J. Shah, Lindenhurst, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 215 days.

(21) Appl. No.: 11/634,607

(22) Filed: Dec. 6, 2006

(65) Prior Publication Data
US 2008/0136294 A1    Jun. 12, 2008

(51) Int. Cl.
*H02K 16/00*    (2006.01)
(52) U.S. Cl. .................................. 310/114; 310/156.25
(58) Field of Classification Search ......... 310/144–121, 310/156.25, 190–191, 262; 322/29, 51–52
See application file for complete search history.

(56) References Cited

U.S. PATENT DOCUMENTS

| | | | | |
|---|---|---|---|---|
| 3,233,133 A | * | 2/1966 | Kober | 310/191 |
| 3,713,015 A | * | 1/1973 | Frister | 322/28 |
| 4,027,229 A | * | 5/1977 | Frink | 322/50 |
| 4,305,031 A | * | 12/1981 | Wharton | 322/29 |
| 4,578,609 A | | 3/1986 | McCarty | |
| 4,749,944 A | | 6/1988 | Okamoto | |
| 4,785,213 A | * | 11/1988 | Satake | 310/116 |
| 4,879,484 A | | 11/1989 | Huss | |
| 4,885,493 A | * | 12/1989 | Gokhale | 310/190 |
| 5,177,391 A | * | 1/1993 | Kusase | 310/263 |
| 5,260,642 A | | 11/1993 | Huss | |
| 5,693,995 A | * | 12/1997 | Syverson | 310/114 |
| 5,955,809 A | | 9/1999 | Shah | |

(Continued)

FOREIGN PATENT DOCUMENTS

FR    2316783 A1    1/1977

(Continued)

OTHER PUBLICATIONS

Extended European Search Report—Jun. 3, 2008.

*Primary Examiner*—Thanh Lam
(74) *Attorney, Agent, or Firm*—Kinney & Lange, P.A.

(57) ABSTRACT

A self-regulating permanent magnet device has a first rotor segment and second rotor segment, each supporting a set of permanent magnets, wherein the position of the second rotor segment relative to the first rotor segment is modified based on the speed of the self-regulating permanent magnet device. By modifying the position of the second rotor segment relative to the first rotor segment, the alignment between their respective sets of permanent magnets, and therefore, the electromotive force (emf) generated in the stator coils is regulated. The position of the second rotor segment is defined by the connection of a torsion spring between the first rotor segment and second rotor segment and a reactionary torque device connected to the second rotor segment. The torsion spring creates a spring force that acts to maintain the alignment between the first rotor segment and the second rotor segment. The reactionary torque device provides reactionary torque that is proportional to the speed of the self-regulating permanent magnet device and opposes the spring force. As the speed of the self-regulating permanent magnet device increases, the reactionary torque causes the second rotor segment to rotate, thereby creating a misalignment between the first rotor segment and second rotor segment.

26 Claims, 5 Drawing Sheets

U.S. PATENT DOCUMENTS

| | | |
|---|---|---|
| 6,249,069 B1 | 6/2001 | Krueger |
| 6,838,860 B2 | 1/2005 | Huggett et al. |
| 6,965,183 B2 | 11/2005 | Dooley |
| 6,975,055 B2 * | 12/2005 | Joong et al. ............ 310/156.01 |
| 6,998,757 B2 | 2/2006 | Seguchi et al. |
| 7,002,274 B2 * | 2/2006 | Kim et al. .................. 310/114 |

FOREIGN PATENT DOCUMENTS

| | | |
|---|---|---|
| GB | 739557 A | 11/1955 |
| GB | 1218056 A | 1/1971 |
| JP | 2-269442 A | 11/1990 |
| WO | 9937017 A1 | 7/1999 |

* cited by examiner ced by permanent magnet
SELF-REGULATING PERMANENT MAGNET DEVICE

BACKGROUND OF THE INVENTION

The present invention relates to electromagnetic devices such as permanent magnet alternators and permanent magnet motors.

Alternators are electromechanical devices that convert mechanical energy to alternating current (AC) electrical energy. Alternators employ a rotor to provide a rotating magnetic field that interacts with stator windings (i.e., conductors wound in coils around an iron core) to cause AC voltage to be generated. The magnitude of the AC voltage generated within the stator windings is directly related to the speed of the rotor and the strength of the magnetic field generated by the rotor.

Generating the magnetic field in the rotor can be done in a number of ways. For example, in wound field synchronous alternators, the rotor may include coils (commonly referred to as field windings) that are energized by providing current to the field windings. The AC power generated by the wound field synchronous generator is controlled by selectively varying the magnitude of the current provided to the field windings, and therefore controlling the strength of the magnetic field generated by the rotor. In the alternative, field windings wrapped around the rotor may be replaced by permanent magnets in what is known as a permanent magnet generator (PMG) or permanent magnet alternator (PMA). These type of machines are generally more efficient and robust than the wound field synchronous machines. However, because the strength of the magnetic field generated by the permanent magnets is constant, control of the AC voltage generated by PMGs is dependent on controlling the speed of the rotor. This drawback makes PMGs impractical in a number of applications, or requires PMGs to include additional hardware such as shunt voltage regulators in order to reduce AC voltage generated at increased rotor speeds. Therefore, it would be beneficial if PMGs could regulate the AC voltage (also referred to as electromotive force (emf)) generated in the stator windings at increased rotor speeds.

Motors are electromechanical devices that convert electrical energy (typically an AC signal) to mechanical energy. Motors work in much the same way as generators, except the direction of power is reversed (i.e., electrical energy is converted to mechanical energy). Motors generate mechanical energy by applying an AC signal to the stator windings. In permanent magnet motors, the AC signal applied to the stator windings generates a rotating magnetic field that interacts with the magnetic field produced by the permanent magnets located on the rotor. The interaction between the magnetic fields results in torque or force being generated on the rotor, causing it to turn. The speed at which the rotor rotates is a function, in part, of the magnitude of the current through the stator windings and the frequency of the current through the stator windings.

The maximum obtainable speed of permanent magnet motors is limited in part by the back electromotive force (bemf) generated in the stator windings by the rotating permanent magnets. The bemf opposes the AC voltage signal applied to create the AC current in the stator windings. As the magnitude of the bemf approaches the magnitude of the AC voltage signal, the amount of AC current that can be provided to the stator windings is reduced. This prevents the permanent magnet motor from further increases in speed. It would be desirable to reduce or limit the bemf generated in the stator coils to allow the permanent magnet motor to achieve higher speeds.

Therefore, it would be beneficial in both motor applications and generator applications to regulate the emf (commonly referred to as the bemf in motor applications).

BRIEF SUMMARY OF THE INVENTION

A self-regulating permanent magnet device is comprised of a first rotor segment having a first compliment of permanent magnets and a second rotor segment having a second compliment of permanent magnets. The back electromotive force (bemf) generated in the stator windings of the self-regulating permanent magnet device is regulated by modifying the relative position of the second rotor segment relative to the first rotor segment. A first shaft is connected to the first rotor segment, and a second, coaxial shaft is connected to provide bearing and support to the second rotor segment as well as a cooling device. A torsion spring is connected between the first shaft and the second shaft, and provides a spring force that acts to maintain alignment between the first rotor segment and second rotor segment such that magnetic poles of the first compliment of permanent magnets and second compliment of permanent magnets are aligned. The relative position of the second rotor segment relative to the first rotor segment is governed by the balance of a spring force provided by the torsion spring and a reactionary torque force provided by the cooling device. As the speed of the self-regulating PMD increases, the reactionary torque force generated by the cooling device increases and changes the position of the second rotor segment relative to the first rotor segment.

DETAILED DESCRIPTION

Figure 1:
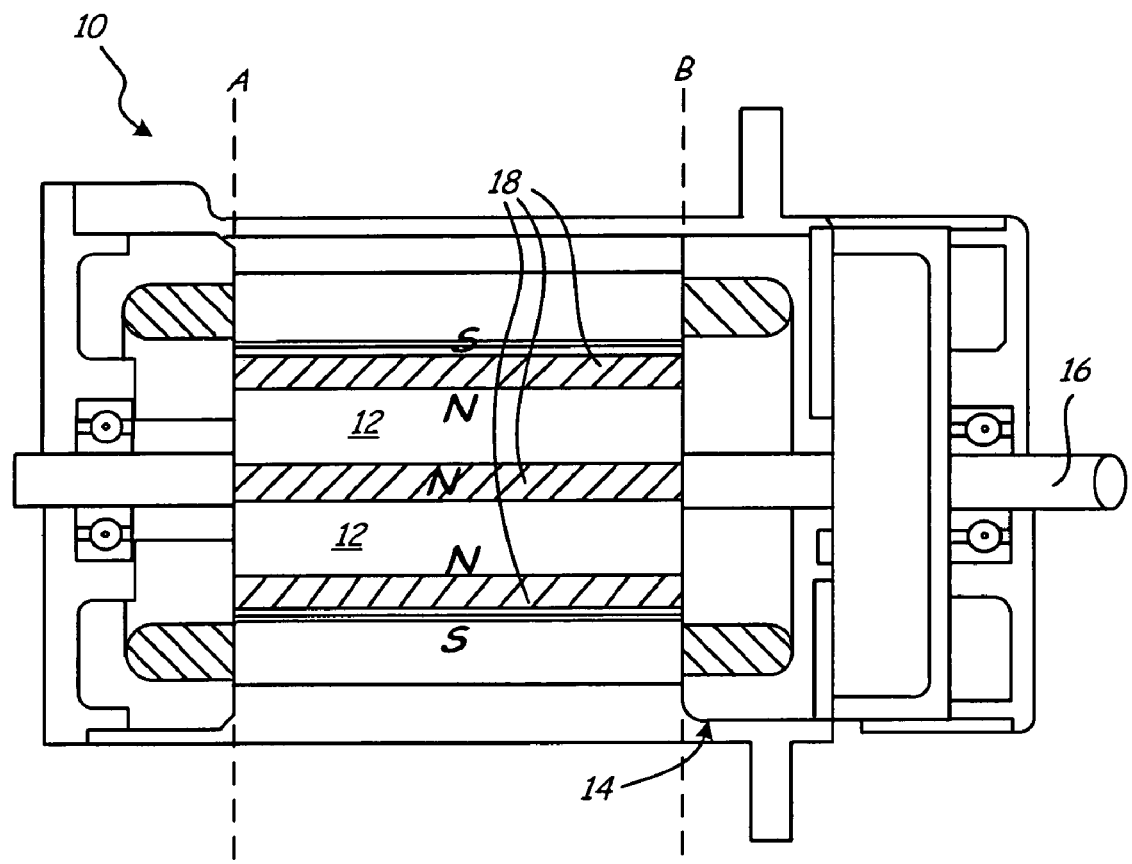
FIG. 1 is a segmented cross section of a standard permanent magnet device as known in the prior art.

FIG. 1 is a broken cross-sectional view of a standard permanent magnet device ("PMD") 10 as known in the prior art. PMD 10 includes rotor 12, stator 14, and shaft 16. Within the dashed line labeled A and B is a cross-sectional view that provides an unobstructed view of rotor 12 and the location of associated permanent magnet set 18. Outside of dashed lines 1A and 1B is a cross-sectional view of stator 14 and shaft 16, wherein shaft 16 is connected to provide/receive rotational energy to/from rotor 12, depending on whether PMD 10 is used in a generator or motor application.

Rotor 12 supports at least one permanent magnet set 18, wherein each permanent magnet included in the set has a magnetic north pole and a magnetic south pole. In a generator application, mechanical energy provided by shaft 16 causes rotor 12 and associated permanent magnet set 18 to rotate. The rotating permanent magnets generate a rotating magnetic field that interacts with the stator coils (not shown) to generate an alternating current (AC) voltage (emf). Because the magnitude of the magnetic field generated by permanent magnet 18 is constant, the magnitude of the voltage generated in the stator coils is directly proportional to the speed of the rotating magnet field.

It is an aspect of the present invention to regulate the emf generated in the stator coils of a PMD by using electrical and mechanical means within the PMD (self-regulating) as the speed of the PMD varies. The self-regulated PMD divides the rotor into a first rotor segment and a second rotor segment, each supporting a corresponding set of permanent magnets. By selectively modifying the position of the second rotor segment relative to the first rotor segment, the emf generated in the stator coils is modified. In generator applications, modifying the emf generated in the stator coils allows the AC output voltage to be regulated within a proscribed range. In motor applications, modifying or reducing the emf (or bemf as it is sometimes called in motor applications) allows the permanent magnet motor to achieve higher motor speeds.

Figure 2A:
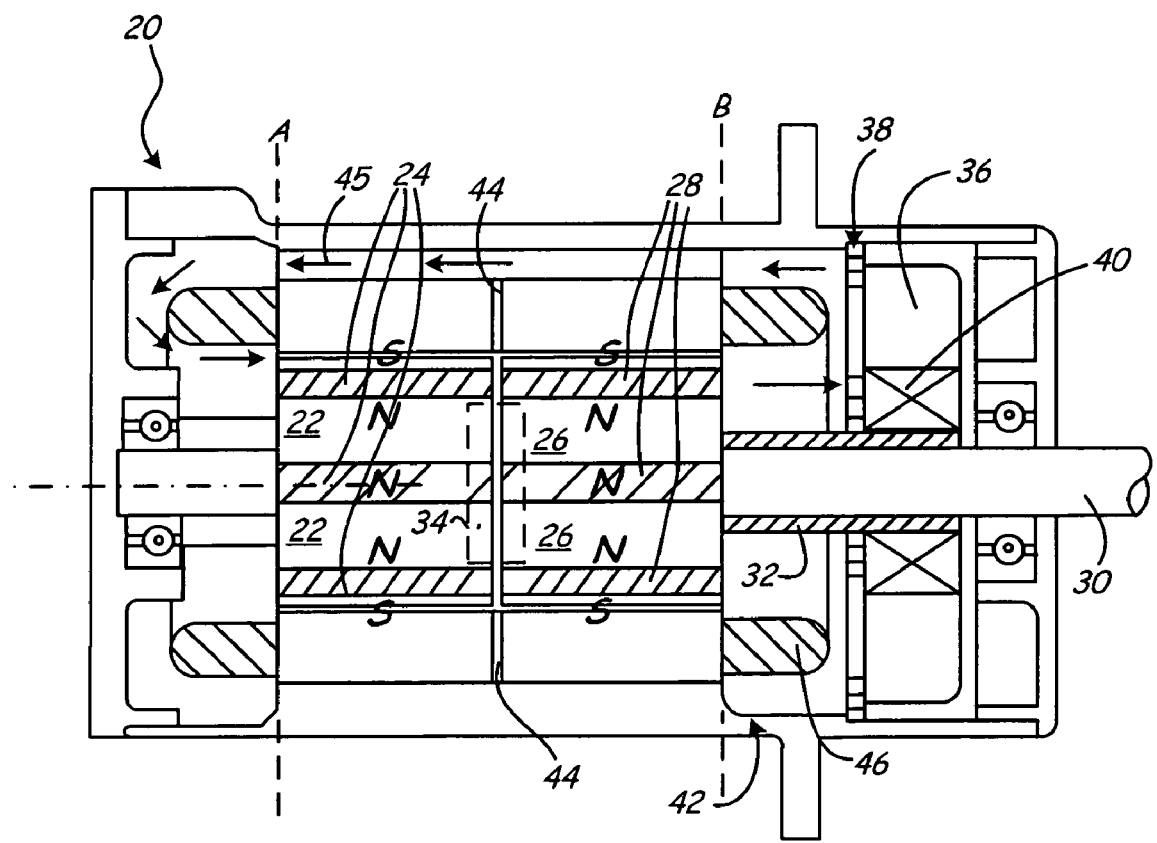
FIG. 2A is segmented cross section of a self-regulating permanent magnet device in a first state.
Figure 2B:
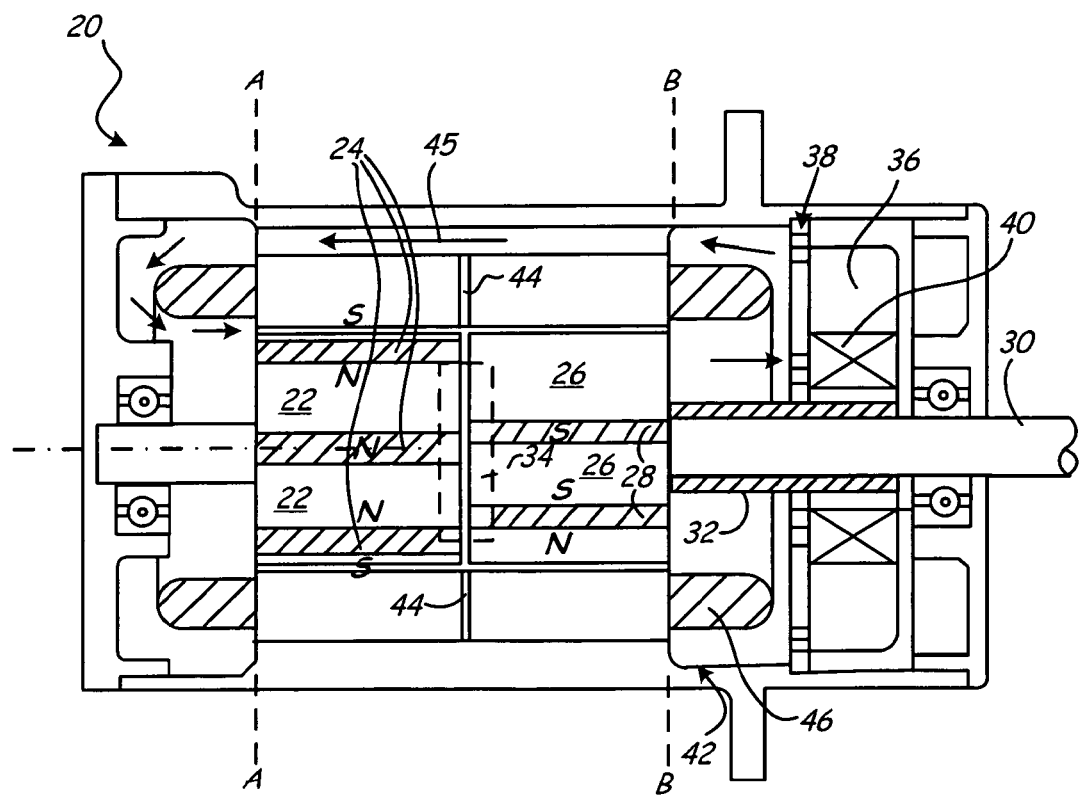
FIG. 2B is a segmented cross section of a self-regulating permanent magnet device in a second state.

FIGS. 2A and 2B illustrate an embodiment of self-regulated permanent magnet device ("PMD") 20 of the present invention, in which the emf generated in the stator coils of the self-regulated PMD is controlled by adjusting the respective position of a second rotor segment and associated permanent magnets with respect to a first rotor segment and associated permanent magnets. Dashed lines labeled A and B provide a segmented cross-sectional view similar to the segmented cross-sectional view shown in FIG. 1.

As shown in FIGS. 2A and 2B, self-regulating PMD 20 includes first rotor segment 22 having an associated first permanent magnet set 24, second rotor segment 26 having an associated second permanent magnet set 28, first shaft 30, second shaft 32, torsion spring 34, collector plate 36, port plate 38, cooling device 40, and stator 42 (which includes magnetic spacer 44 and laminated core 46). For the sake of simplicity, FIGS. 2A and 2B are described with respect to a generator application, in which it is desirable to regulate the output voltage within a proscribed range. The generator application illustrates the ability of the present invention to regulate the emf generated in the stator windings of the stator, which is applicable to the motor application which regulates the emf (sometimes referred to as the bemf) to increase motor speed.

FIG. 2A shows a segmented cross-sectional view of a self-regulating permanent magnet alternator (PMA) 20 in a first state when self-regulating PMA 20 is operating at rest or at a low initial speed (i.e., when it is desirable to maximize output voltage versus speed). FIG. 2B shows self-regulating PMA 20 in a second state when self-regulating PMA 20 is operating at a higher speed (i.e., when it is desirable or necessary to regulate the output voltage versus speed).

As shown in FIGS. 2A and 2B, first rotor segment 22 is supported by first shaft 30. Mechanical energy provided by first shaft 30 is communicated to first rotor segment 22, causing first rotor segment and associated first permanent magnet set 24 to rotate.

Second rotor segment 26 is supported by second shaft 32. Second shaft 32 is located coaxially with first shaft 30, and is supported by bearings that allow second shaft 32 to rotate with respect to first shaft 30. Torsion spring 34 is connected on one end to first rotor segment 22, and on another end to second rotor segment 26 (shown in more detail in FIG. 3). Mechanical energy provided to first rotor segment 22 is transmitted by torsion spring 34 to second rotor segment 26. Therefore, mechanical energy provided by first shaft 30 is communicated not only to first rotor segment 22, but also to second rotor segment 26.

In addition, second shaft 32 connects second rotor segment 26 to cooling device 40, such that mechanical energy provided to second shaft 32 is also transmitted to cooling device 40. Collector plate 36 mounts cooling device 40 to the casing (not shown) of self-regulated PMA 20, while port plate 38 provides openings that allow cooling airflow or coolant flow to be provided to the stator coils (not shown).

The connection between first rotor segment 22 and second rotor segment 26, as well as the connection between second rotor segment 26 and cooling device 40, provides the mechanism by which the position of the respective permanent magnets are modified based on the speed of the self-regulating PMA 20. When the self-regulating PMA 20 is at rest as shown in FIG. 2A, first shaft 30 does not provide any mechanical energy to first rotor segment 22. Torsion spring 34, connected between first rotor segment 22 and second rotor segment 26, provides a spring force that maintains the alignment between the magnetic poles of first permanent magnet set 24 and the magnetic poles of second permanent magnet set 28. By aligning the magnetic poles of the first and second permanent magnets, the amount of magnetic flux provided to the stator coils is maximized, thereby maximizing the output voltage (emf) initially generated by the self-regulating PMA 20.

As the speed of PMA 20 increases, the position of second permanent magnet set 28 is rotated relative to first permanent magnet set 24 such that the magnetic poles of the permanent magnet sets are no longer aligned (as shown in FIG. 2B). The misalignment of the respective magnetic poles reduces the magnetic flux provided to the stator coils, and therefore reduces the output voltage (emf) that would otherwise be generated if the magnetic poles remained aligned.

The misalignment of second rotor segment 26 is accomplished by providing a force opposite to the spring force generated by torsion spring 34. This force is provided by the connection of cooling device 40 to second rotor segment 26. As the mechanical force provided by first shaft 30 increases, increasing the speed of both first rotor segment 22 and second rotor segment 26, the mechanical energy provided to cooling device 40 generates "drag" or reactionary torque on second rotor segment 26. The reactionary torque opposes the spring force provided by torsion spring 34 such that torsion spring 34 becomes wound or loaded. The winding or loading of torsion spring 34 results in second rotor segment 26 being rotated with respect to first rotor segment 22, as shown in FIG. 2B. This misalignment between first rotor segment 22 and second rotor segment 26 results in a misalignment between the magnetic poles of first permanent magnet set 24 and second permanent magnet set 28, reducing the amount of magnetic flux provided to the stator coils and thereby reducing the output voltage (emf) that would otherwise be generated by self-regulated PMA 20 had the permanent magnets remained aligned.

In one embodiment of the present invention, in addition to providing reactionary torque necessary modify the position of second rotor segment 26, cooling device 40 provides a mechanism for removing heat generated by the stator coils. As shown in FIGS. 2A and 2B, stator 42 is located coaxially around the periphery of first rotor segment 22 and second rotor segment 26. Stator 42 includes laminated core 46, and a number of windings (not shown) wrapped around laminated core 46 such that rotating magnetic fields provided by first set of permanent magnets 24 and second set of permanent magnets 28 generates an output voltage through the windings. As the output voltage generated in the stator coils increases, an increasing amount of heat is generated in the stator coils. A by-product of using cooling device 40 to provide the reactionary torque necessary to change the alignment between second rotor segment 26 and first rotor segment 22 is cooling means provided by cooling device 40 to the stator coils. In one embodiment, cooling device 40 may be a fan that provides cooling airflow to the stator coils as shown by arrows 45. In another embodiment, cooling device 40 may be a coolant pump or flyweight-type governor that provides air, coolant or some other liquid to the surface of the stator coils. In addition, cooling device 40 may be replaced by any number of devices capable of creating the reactionary torque or drag necessary to modify the position of second rotor segment 26.

In addition, in one embodiment an air gap or magnetic spacer 44 may be placed within stator 42 along the same axis separating first rotor segment 22 from second rotor segment 26. Magnetic spacer 44 is a non-magnetic material that prevents the transference of magnetic flux from the portion of stator core 46 surrounding first rotor segment 22 and the portion of stator core 46 surrounding second rotor segment 26.

Figure 3:
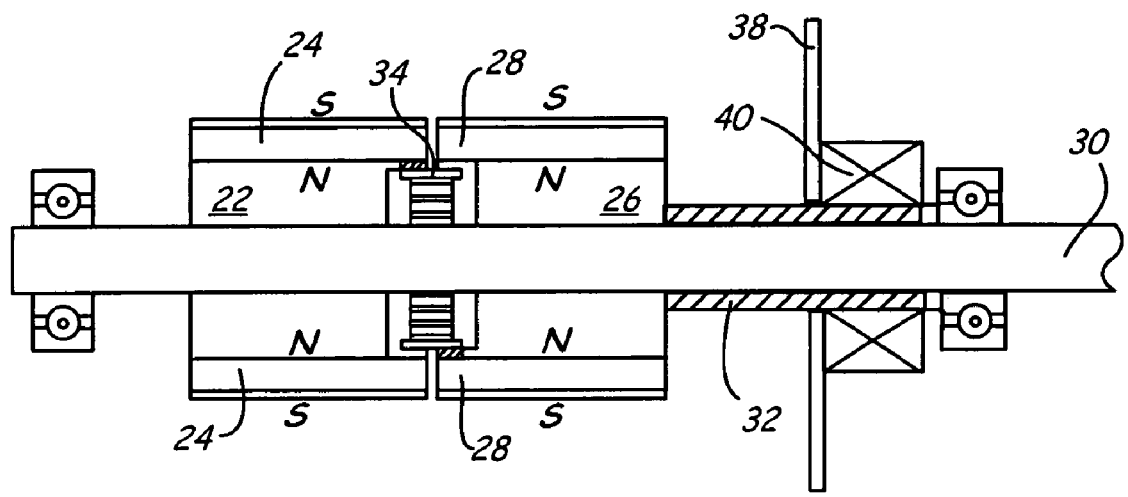
FIG. 3 is a cross-section illustrating the connection of a torsion spring between a first rotor segment and a second rotor segment.

FIG. 3 is a cross-sectional view of self-regulating PMA 20 illustrating in more detail the location of torsion spring 34 and connection to first rotor segment 22 and second rotor segment 26. In the embodiment shown in FIG. 3, torsion spring 34 is a spiral spring that is connected on one end to first rotor segment 22 and on the opposite end to second rotor segment 26. Torsion spring 34 is wound or "loaded" such that when no reactionary torque is provided by cooling device 40, torsion spring 34 exerts sufficient force on second rotor segment 26 to maintain alignment between the magnetic poles of first permanent magnet set 24 and second permanent magnet set 28. That is, torsion spring 34 overcomes the magnetic repulsion force generated between magnetic poles of the same type (e.g., magnetic north poles) from rotating second rotor segment 26 relative to first rotor segment 22.

As the speed of PMA 20 increases, the reactionary torque generated by cooling device 40 (or other device capable of providing reactionary torque or drag on second rotor segment 26) increases. The reactionary torque opposes the spring force generated by torsion spring 34, and because torsion spring 34 in this embodiment is a spiral spring, begins to wind torsion spring 34. Because torsion spring 34 is connected to first rotor segment 22 on one end, and second rotor segment 26 on the other end, the winding of torsion spring 34 causes second rotor segment 26 to rotate with respect to first rotor segment 22. The rotation of second rotor segment 26 results in a misalignment between first permanent magnet set 24 and second permanent magnet set 28 that is proportional to the speed of self-regulating PMA 20.

Although FIG. 3 teaches the use of a spiral spring, a number of different springs may be used to effectuate the desired rotation between first rotor segment 22 and second rotor segment 26. Depending on the type of torsion spring 34 employed, at least two types of output voltage regulation may be achieved. In the first, continuous voltage regulation is provided by using a spring similar to the spiral spring shown in FIG. 3 that continually adjusts the position of second rotor segment 26 with respect to first rotor segment 22 based on the speed of first shaft 30. An alternative to continuous voltage regulation using a spiral-type spring, is step-wise voltage regulation. Instead of a spiral spring, an over-center or buckling spring is employed. This type of spring resists winding or loading until a threshold amount of reactionary torque is applied by cooling device 40, at which point the over-center spring buckles. When employed in self-regulated PMA 20 shown in FIGS. 2A and 2B, this type of spring maintains the position of second rotor segment 26 with respect to first rotor segment 22 until a threshold speed (and therefore threshold reactionary force) is reached. Therefore, the output voltage generated by self-regulated PMA 20 increases linearly until the threshold speed is met, at which time second rotor segment 26 rotates completely within the proscribed range of motion defined by the mechanical stops (not shown) and the output voltage (emf) decreases in step-like fashion. As the speed of self-regulated PMA 20 continues to increase, the output voltage (emf) continues to increase in linear fashion, but due to the misalignment between first rotor segment 22 and second rotor segment 26, the maximum voltage generated by self-regulated PMA 20 is less than what would otherwise be generated.

Figure 4:
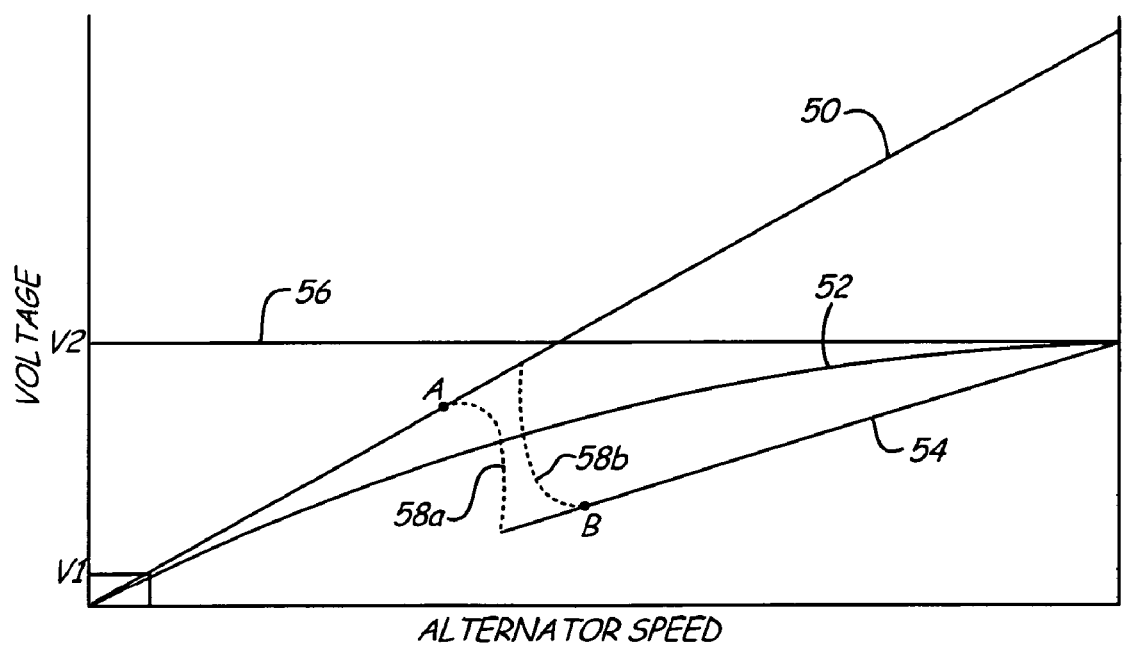
FIG. 4 is a graph illustrating rectified alternator voltage versus alternator speed for a self-regulating permanent magnet alternator and a permanent magnet alternator that is not self-regulating.

FIG. 4 is a graph illustrating the relationship between output voltage and speed of a permanent magnet alternator. Line 50 represents the relationship between output voltage (emf) and speed of an unregulated PMA as known in the prior art (shown in FIG. 1). Line 52 illustrates the relationship between output voltage and speed of self-regulated PMA 20 providing continuous regulation of output voltage (emf), and line 54 illustrates the relationship between output voltage (emf) and speed of a self-regulated PMA 20 providing step-wise regulation of output voltage (emf). In this example, it is desirable to regulate the rectified output voltage generated by the PMA such that it remains below the voltage level indicated by line 56.

As shown by line 50, in the PMA known in the prior art, the rectified output voltage (emf) generated by the PMA increases linearly as the speed of the PMA increases. Furthermore, the rectified output voltage (emf) generated by the prior art PMA far exceeds the desired voltage level indicated by line 56.

Line 52 illustrates the rectified output voltage (emf) generated by a continuous mode self-regulated PMA 20 (e.g., employing a spiral type torsion spring). As the speed of self-regulated PMA 20 increases, torsion spring 34 winds or loads such that the position of second rotor segment 26 relative to first rotor segment 22 is continually adjusted based on the current speed of self-regulated PMA 20. In this embodiment, torsion spring 34 is selected such that second rotor segment 26 reaches the mechanical stop (which acts to prevent further rotation by second rotor segment 26 relative to first rotor segment 22) at the highest rated speed of self-regulated PMA 20. At the highest rated speed of self-regulated PMA 20, the rectified output voltage remains within the proscribed voltage range defined by line 56.

Line 54 illustrates the rectified output voltage (emf) generated by a step-wise mode self-regulated PMA 20 (i.e., employing an over-center or buckling spring). In this embodiment, the over-center or buckling spring resists buckling at low speeds, resulting in the rectified output voltage (emf) increasing linearly with respect to the speed of self-regulated PMA 20 until a threshold speed is reached. Upon reaching the threshold speed (shown by point A), the over-center spring or buckling spring buckles, resulting in second rotor segment 26 rotating against the mechanical stop. This rotation results in a sudden misalignment between the magnetic poles of second permanent magnet set 28 and first permanent magnet set 24. The resulting decrease in magnetic flux provided to the stator coils causes the rectified output voltage (emf) to decrease in step-like fashion as shown by dashed line 58a. Following the buckling of the over-center spring and full rotation of second rotor segment 26 relative to first rotor segment 22, the rectified output voltage (emf) continues to increase linearly with respect to the speed of self-regulated PMA 20 as shown by line 54. At the top-rated speed of self-regulated PMA 20, the output voltage (emf) is still maintained with the proscribed voltage range.

As the speed of self-regulated PMA 20 decreases, the rectified output voltage (emf) decreases linearly with respect to the speed of self-regulated PMA 20 until a second threshold speed is reached (i.e., point B). At this speed, the reactionary torque provided by fan 40 is no longer sufficient to overcome the spring force provided by torsion spring 34, resulting in second shaft 32 rotating back to the original position such that the magnetic poles of first permanent magnet 24 and second permanent magnet 28 are aligned. This causes the output voltage (emf) to increase in step-like fashion as shown by line 58*b*.

The different speeds at which the second rotor segment 26 is rotated with respect to the first rotor segment 22 depending on whether speed of the self-regulated PMA is increasing or decreasing is a function of the type of torsion spring employed, and is known as hysteresis.

Therefore, as shown by the output voltage curves (52 and 54) for the self-regulated PMA 20 acts to maintain the output voltage (emf) within a proscribed range despite increases in the speed that would otherwise lead to excessively high output voltages (emf).

Although FIGS. 2A-4 were described with respect to a generator application, the mechanism for regulating the bemf induced in the stator windings is essentially the same for motor applications.

In contrast to generator applications, in which mechanical energy is provided to the rotor by the first shaft and then converted to electrical energy, in motor applications the stator provides electrical energy that interacts with the rotor to cause the shaft connected to the rotor to rotate. The top speed of a typical permanent magnet motor is limited by the magnitude of the bemf, which increases as the speed of the permanent magnet motor increases.

The self-regulating permanent magnet motor would include a first rotor segment having an associated first permanent magnet set, a second rotor segment having an associated second permanent magnet set, a first shaft, a second shaft, a torsion spring, a collector plate, a port plate, a cooling device, and a stator (which includes a magnetic spacer and a laminated core). The self-regulating permanent magnet motor would be connected as shown in FIGS. 2A-3, the only difference being that the self-regulating permanent magnet motor would include a controller for providing an AC signal to the stator windings wrapped around the stator. The AC signal is controlled to generate torque on the rotor to generate mechanical energy in the first shaft.

The top speed of the self-regulating permanent magnet motor is increased by decreasing the bemf generated in the stator coils. As discussed above with respect to FIGS. 2A-4, as the speed of the permanent magnet motor increases, the relative position between a first rotor segment and a second rotor segment is adjusted. In particular, at increased speeds, the reactionary torque generated by the cooling device on the second rotor segment causes the segment rotor segment to become misaligned with respect to the first rotor segment.

At low speeds, in which the magnitude of the bemf generated in the stator coils is relatively insignificant, the first and second segments are positioned such that the permanent magnets located on the first and second rotor segments are aligned (as shown in FIG. 2A). As the speed of the permanent magnet motor increases, the second rotor segment is rotated with respect to the first rotor segment. The misalignment between the first rotor segment and second rotor segment results in a decrease in magnetic flux being provided to the stator windings, and therefore decrease the bemf generated in the stator windings. By decreasing the bemf generated in the stator coils, the self-regulating permanent magnet motor is able to achieve higher speeds than a typical permanent magnet motor.

The present invention describes a method of providing self-regulation of the emf (or bemf) generated in the stator coils of a permanent magnet generator by automatically modifying the alignment between a first rotor segment and a second rotor segment based on the speed of the self-regulated PMD. By regulating the emf, the present invention can be used in generator application to regulate the output voltage generated as a function of speed of the generator, and in motor applications to increase the operating speed of the motor. Although the present invention has been described with reference to a number of embodiments, workers skilled in the art will recognize that changes may be made in form and detail without departing from the spirit and scope of the invention.

The invention claimed is:

1. A self-regulating permanent magnet device comprising:
    a first shaft;
    a stator core having stator windings; and
    a rotor situated within the stator core, the rotor comprising:
        a first rotor segment connected to the first shaft and having a first set of permanent magnets;
        a second rotor segment located adjacent to the first rotor segment and having a second set of permanent magnets;
        spring means connected between the first rotor segment and the second rotor segment for generating a spring force that maintains rotational alignment between the first set of permanent magnets and the second set of permanent magnets when the first shaft is at rest; and
        reactionary means for generating reactionary torque based on the speed of the first shaft, wherein the reactionary torque opposes the spring force and causes the misalignment of the first set of permanent magnets with respect to the second set of permanent magnets such that the electromotive force (emf) generated in the stator windings of the stator core is regulated based on the speed of the self-regulating permanent magnet device.

2. The self-regulating permanent magnet device of claim 1, wherein the reactionary means for generating reactionary torque includes:
    a cooling device connected to a second shaft that provides mechanical energy from the second rotor segment to the cooling device.

3. The self-regulating permanent magnet device of claim 2, wherein the cooling device is selected from a group consisting of: a fan, a coolant pump, and a flyweight-type governor.

4. The self-regulating permanent magnet device of claim 1, wherein the spring means includes a spiral-type spring having a first end connected to the first rotor segment and a second end connected to the second rotor segment.

5. The self-regulating permanent magnet device of claim 1, wherein the spring means includes a buckling-type spring having a first end connected to the first rotor segment and a second end connected to the second rotor segment.

6. The self-regulating permanent magnet device of claim 1, wherein the self-regulating permanent magnet device comprises a self-regulating permanent magnet generator that regulates the output voltage (emf) generated in the stator coils of the stator core based on the mechanical energy provided to the self-regulating permanent magnet generator by the first shaft.

7. The self-regulating permanent magnet of claim 1, wherein the self-regulating permanent magnet device comprises a self-regulating permanent magnet motor that regulates the back electromotive force (bemf) generated in the stator coils of the stator core based on the mechanical energy generated by the self-regulating permanent magnet motor in the first shaft.

8. A self-regulating permanent magnet alternator (PMA) for regulating an output voltage, the self-regulating permanent magnet alternator comprising:
- a first shaft for providing mechanical energy;
- a stator core having stator windings that generate an output voltage based on magnetic flux provided through the stator windings;
- a rotor situated within the stator core for providing magnetic flux to the stator windings that varies based on the speed of the first shaft such that the output voltage generated by the self-regulating PMA is maintained within a proscribed range, the rotor comprising:
  - a first rotor segment connected to receive mechanical energy from the first shaft and having a first set of permanent magnets;
  - a second rotor segment located adjacent to the first rotor segment and having a second set of permanent magnets;
  - a torsion spring having a first end connected to the first rotor segment and a second end connected to the second rotor segment wherein the torsion spring transmits mechanical energy provided to the first rotor segment to the second rotor segment and provides a spring force that acts to maintain rotational alignment between the first permanent magnet set and the second permanent magnet set;
  - a second shaft located coaxially around the first shaft and supported by bearings that allow the second shaft to rotate with respect to the first shaft, wherein the second rotor segment is supported by the second shaft; and
  - a cooling device connected to the second shaft wherein the second shaft transmits mechanical energy from the second rotor segment to the cooling device, wherein the mechanical energy supplied to the cooling device generates reactionary torque on the second rotor segment that opposes the spring force generated by the torsion spring and modifies the rotational position of the second rotor segment with respect to the first rotor segment such that the amount of magnetic flux provided to the stator coils is modified.

9. The self-regulating (PMA) of claim 8, further including:
- a mechanical stop positioned between the first shaft and the second shaft to limit the amount of rotation allowed between the second rotor segment and the first rotor segment.

10. The self-regulating PMA of claim 8, wherein the torsion spring is a spiral spring connected between the first rotor segment and the second rotor segment that provides continual rotational alignment adjustment of the first permanent magnet set and the second permanent magnet set based on the speed of the first shaft.

11. The self-regulating PMA of claim 8, wherein the torsion spring is an over-center type spring connected between the first rotor segment and the second rotor segment that provides step-wise rotational alignment adjustment of the first permanent magnet set and the second permanent magnet based on the speed of the first shaft.

12. The self-regulating PMA of claim 8, wherein the cooling device provides reactionary torque to the second rotor segment that is proportional to the speed of the first shaft.

13. The self-regulating PMA of claim 12, wherein the cooling device is selected from a group consisting of: a fan, a coolant pump, and a flyweight type governor.

14. The self-regulating PMA of claim 8, wherein the stator core includes a magnetic spacer that prevents magnetic flux from a first portion of the stator core located near the first permanent magnet from transferring to a second portion of the stator core located near the second permanent magnet.

15. A rotor for a self-regulating permanent magnet device that regulates an amount of flux provided to a stator core based on a speed of a first shaft, the rotor comprising:
- a first rotor segment connected to the first shaft;
- a first set of permanent magnets mounted on the first rotor segment;
- a second rotor segment mounted on a second shaft located axially around the first shaft, wherein the second shaft is mounted axial around the first shaft such that the second rotor segment is rotatable relative to the first rotor segment;
- a second set of permanent magnets mounted on the second rotor segment;
- a torsion spring connected between the first rotor segment and the second rotor segment that provides a spring force for maintaining rotational alignment of the second rotor segment relative to the first rotor segment;
- a reactionary torque device connected to the second shaft to receive mechanical energy from the second rotor segment, wherein the reactionary torque device generates reactionary torque proportional to the speed of the first shaft that alters the alignment of the second rotor segment relative to the first rotor segment.

16. The rotor of claim 15, wherein the torsion spring is a spiral-type spring that continually modifies the rotational position of the second rotor segment with respect to the first rotor segment based on reactionary torque provided by the reactionary torque device.

17. The rotor of claim 15, wherein the torsion spring is a buckling-type spring that provides step-wise modification of the rotational position of the second rotor segment with respect to the first rotor segment based on reactionary torque provided by the reactionary torque device.

18. The rotor of claim 15, wherein the spring force provided by the torsion spring is sufficient to overcome magnetic repulsive forces generated between the magnetic poles of the first set of permanent magnets and the magnetic poles of the second set of permanent magnets such that the magnetic poles of first permanent magnet set remain rotationally aligned with the magnetic poles of the second permanent magnet set.

19. A self-regulating permanent magnet motor comprising:
- a first shaft for providing mechanical energy generated by the self-regulating permanent magnet motor to an output;
- a stator core having stator windings that receive an alternating current (AC) input voltage that generate a rotating magnetic field;
- a rotor situated within the stator core for generating mechanical power in the first shaft based on the rotating magnetic field generated by the stator core, the rotor comprising:
  - a first rotor segment connected to the first shaft and having a first set of permanent magnets;
  - a second rotor segment located adjacent to the first rotor segment and having a second set of permanent magnets;
  - a torsion spring having a first end connected to the first rotor segment and a second end connected to the second rotor segment wherein the torsion spring transmits mechanical energy from the first rotor segment to the second rotor segment and provides a spring force that acts to maintain rotational alignment between the first permanent magnet set and the second permanent magnet set;

a second shaft located coaxially around the first shaft and supported by bearings that allow the second shaft to rotate with respect to the first shaft, wherein the second rotor segment is supported by the second shaft; and a cooling device connected to the second shaft wherein the second shaft transmits mechanical energy from the second rotor segment to the cooling device, wherein the mechanical energy supplied to the cooling device generates reactionary torque on the second rotor segment that opposes the spring force generated by the torsion spring and modifies the rotational position of the second rotor segment with respect to the first rotor segment such that the back electromotive force generated in the stator coils by the rotor is reduced.

20. The self-regulating permanent magnet motor of claim 19, further including:

a mechanical stop positioned between the first shaft and the second shaft to limit the amount of rotation allowed between the second rotor segment and the first rotor segment.

21. The self-regulating permanent magnet motor of claim 19, wherein the torsion spring is a spiral spring connected between the first rotor segment and the second rotor segment that provides continual rotational alignment adjustment of the first permanent magnet set and the second permanent magnet set based on the speed of the first shaft.

22. The self-regulating permanent magnet motor of claim 19, wherein the torsion spring is an over-center type spring connected between the first rotor segment and the second rotor segment that provides step-wise rotational alignment adjustment of the first permanent magnet set and the second permanent magnet based on the speed of the first shaft.

23. The self-regulating permanent magnet motor of claim 19, wherein the cooling device provides reactionary torque to the second rotor segment that is proportional to the speed of the first shaft.

24. The self-regulating permanent magnet motor of claim 19, wherein the cooling device is selected from a group consisting of: a fan, a coolant pump, and a flyweight type governor.

25. The self-regulating permanent magnet motor of claim 19, wherein the stator core includes a magnetic spacer that prevents magnetic flux from a first portion of the stator core located near the first permanent magnet from transferring to a second portion of the stator core located near the second permanent magnet.

26. The self-regulating permanent magnet motor of claim 19, wherein reducing the bemf generated in the stator windings of the stator core increases the maximum operating speed of the self-regulating permanent magnet motor.

* * * * *

UNITED STATES PATENT AND TRADEMARK OFFICE
CERTIFICATE OF CORRECTION

PATENT NO. : 7,642,683 B2  Page 1 of 1
APPLICATION NO. : 11/634607
DATED : January 5, 2010
INVENTOR(S) : Powers et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 344 days.

Signed and Sealed this

Sixteenth Day of November, 2010

David J. Kappos
*Director of the United States Patent and Trademark Office*